United States Patent [19]
Zottoli

[11] 3,739,722
[45] June 19, 1973

[54] PRINT ROLL AND MOUNTING MEANS
[75] Inventor: Robert A. Zottoli, Braintree, Mass.
[73] Assignee: Gross Instrument Company, Quincy, Mass.
[22] Filed: Aug. 13, 1971
[21] Appl. No.: 171,501

[52] U.S. Cl.................................. 101/375, 29/125
[51] Int. Cl....................... B41f 13/10, B21b 31/08
[58] Field of Search .................. 101/375, 376, 377, 101/378; 29/117, 125, 129; 279/58; 267/63

[56] References Cited
UNITED STATES PATENTS

| | | | |
|---|---|---|---|
| 687,697 | 11/1901 | Roddy | 101/378 |
| 2,181,798 | 11/1939 | Blackley | 101/348 |
| 3,694,844 | 10/1972 | Welter | 29/125 X |
| 7,706 | 10/1850 | Ray | 267/63 |
| 2,356,010 | 8/1944 | Seymour | 29/125 |
| 2,587,606 | 3/1952 | Dungler | 101/375 |
| 2,610,066 | 9/1952 | Pigott | 279/58 |

FOREIGN PATENTS OR APPLICATIONS
9,841    7/1915   Great Britain....................... 101/378

Primary Examiner—Robert E. Pulfrey
Assistant Examiner—Paul T. Sewell
Attorney—Herbert W. Kenway, Melvin R. Jenny and Townsend M. Gunn et al.

[57] ABSTRACT

A plurality of plate cylinder printing rolls on a shaft in axial alignment and with the inner ends in tight abutment, each having a collet sleeve provided at each end of the roll, collets on the shaft and in the sleeves, threads and nuts on the shaft for exerting axially directed forces against the collets, resilient deformable O-rings between the opposing faces of the collets at the abutting inner ends, the said forces causing the O-ring to deform to cause the collets to be driven inward to grip the shaft at the inner abutting ends while simultaneously the collets at the outer ends are driven inwardly to tighten the latter on the shaft.

8 Claims, 6 Drawing Figures

Patented June 19, 1973

INVENTOR
ROBERT A. ZOTTOLI

BY Kenway, Jenney & Hildreth

ATTORNEYS

Patented June 19, 1973
3,739,722
2 Sheets-Sheet 2
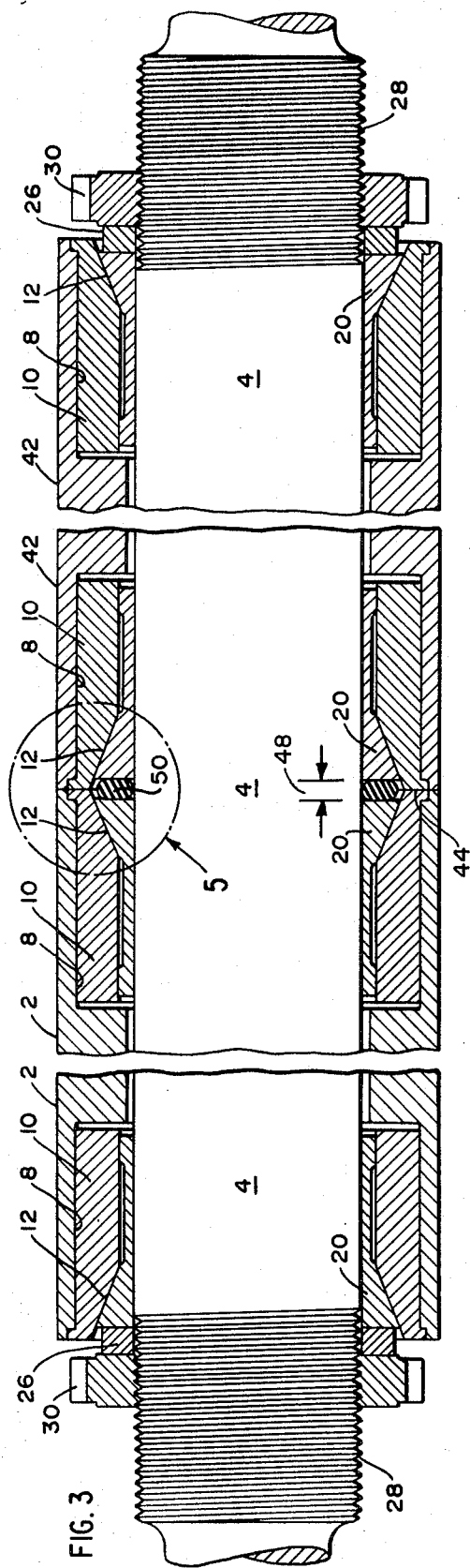
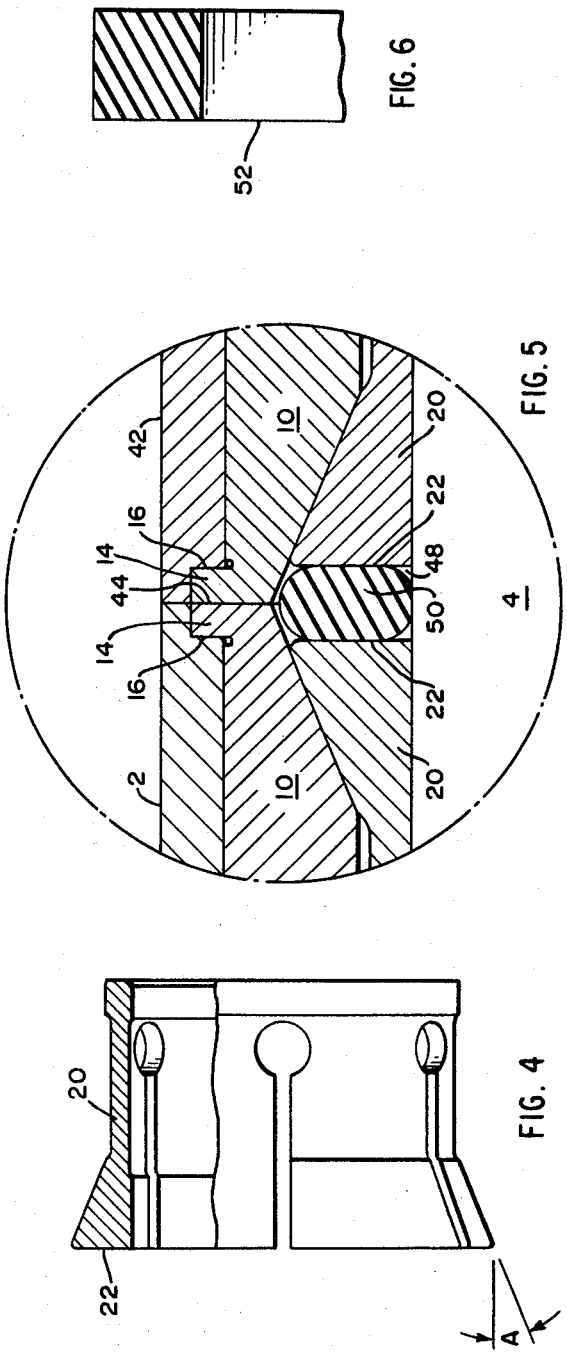
INVENTOR
ROBERT A. ZOTTOLI
BY
Kenway, Jenney & Hildreth
ATTORNEYS

PRINT ROLL AND MOUNTING MEANS

BACKGROUND OF THE INVENTION

It is known to mount a printing cylinder on a shaft by means of tapered collets, one at each end. Stationary abutments are then provided on the shaft, and nuts are threaded on threaded sleeves which bear on the one side against the abutment. By turning the nuts, the sleeves are forced against the faces of the collets in order to drive them inwardly and thus lock them upon the shaft so as to anchor the printing roll thereon.

Such devices have inherent problems, one of which is that it is necessary to provide either grooves on the shaft at predetermined locations into which can be mounted the said abutments, and these grooves weaken the shaft; or collar-like abutments must be clamped to the shaft against which the nuts turn in order to thrust the above sleeve against the collets.

The difficulty with the latter is that unless extreme care is used, it is difficult to balance the collars so that the shaft will be vibration free when the printing roll is operating at the relatively high speed used in today's presses; or, the collar itself may come loose with the result that collets at either one end or the other of the printing roll may loosen with consequent improper turning and vibration of the printing roll on its shaft.

Another difficulty in the prior art devices is that when collets are used, a collet is used at each end of the cylinder. Therefore, if one wishes to use a print roll, for example, 4 feet long, the entire roll must be made 4 feet long and then mounted on the suitable shaft by means of the collet at each end. Such long print rolls are very expensive to make. Also, if such a print roll becomes damaged along its length at any point, the whole roll must be remade or refurbished, which in turn becomes expensive.

Accordingly, it has long been a desire to align shorter print rolls axially on the shaft with their inner ends in tight abutment, until the desired overall length is reached, and then anchor each end of each roll to the shaft while maintaining the inner ends in the tight abutment. Hitherto, it has been found impossible to accomplish this.

SUMMARY OF THE INVENTION

It is desired that the above difficulties be solved, and one of the fundamental purposes of this invention is to provide a combined printing roll and a shaft in which the locking means comprises a collet sleeve at each end of the shaft into which are positioned the collets. However, the shaft itself is provided with threads, and nuts threaded thereon may be turned to bear against spacers which in turn bear against the outer faces of the collets to lock the latter on the shaft. Balancing is not a problem in such a construction. Also, by making the shaft threads an inch or so long at each end of the roll, it is possible to accomplish very precise axial adjustment of the print roll on the shaft by moving one nut in one axial direction and then tightening the other nut against the collet face on the other end of the roll, until the collets again are seated firmly on the shaft, thus moving the print roll in the desired direction.

A second fundemental purpose of this invention to provide a combination of a print roll, a shaft, and fastening means such that a plurality of print rolls can be mounted on the shaft with collets at each end of each roll, so that when force is applied axially against the two outermost collets then the cylinders will be driven into tight abutment and the inner collets will also be forced to close upon the shaft in order to grip the shaft securely. In this manner, any number of the short print rolls may be mounted in axial alignment, and securely fastened to the shaft at the end of each roll without any gap occurring where one cylinder ends and the next begins.

A further fundamental purpose of each embodiment is to provide means for attaching cylinders to a shaft in such manner as to lock the cylinders securely thereto, but provide simple means for loosening the cylinders for axial and/or rotary adjustment.

Another object of the invention is the provision of a combined print roll and shaft of the above kind, in which means are provided to adjust the position of the cylinder axially on the shaft from one end of the latter to the other, and thereafter to lock the cylinder on the shaft in the preselected position.

A still further object of the invention is the provision of a print roll and shaft assembly in which a plurality of print rolls are mounted on the shaft, with means between the print roll for fastening the inner ends thereof securely to the shaft while leaving the inner ends in a tight but close-fitting abutment.

Yet another object of the invention is the provision of the print roll and shaft assembly above, in which collets are used at the abutting inner ends of the print roll, with means to insure that these inner collets will be locked to the shaft at the time that the outer collets are locked to the shaft by tightening means.

Other objects, features and advantages will be in part apparent and in part pointed out hereinafter.

The invention accordingly comprises the elements and combinations of elements, features of construction, and arrangement of parts, which will be exemplified in the structures hereinafter described, and the scope of the application of which will be indicated in the appended claims.

In the accompanying drawings, in which several of the various possible embodiments of the invention are illustrated:

FIG. 3 is an elevation partly in section of a third embodiment of the invention;

FIG. 4 is an illustration of a collet that may be used in all embodiments of the invention;

FIG. 5 is an enlarged view in section of a portion of the FIG. 3 embodiment; and FIG. 6 is a portion of an alternate ring of elastomeric material that may be used in the invention.

Throughout the drawings, similar reference characters indicate corresponding parts, and dimensions of certain of the parts as shown in the drawings may have been modified and/or exaggerated for the purposes of clarity of illustration and understanding of the invention.

Figure 1:
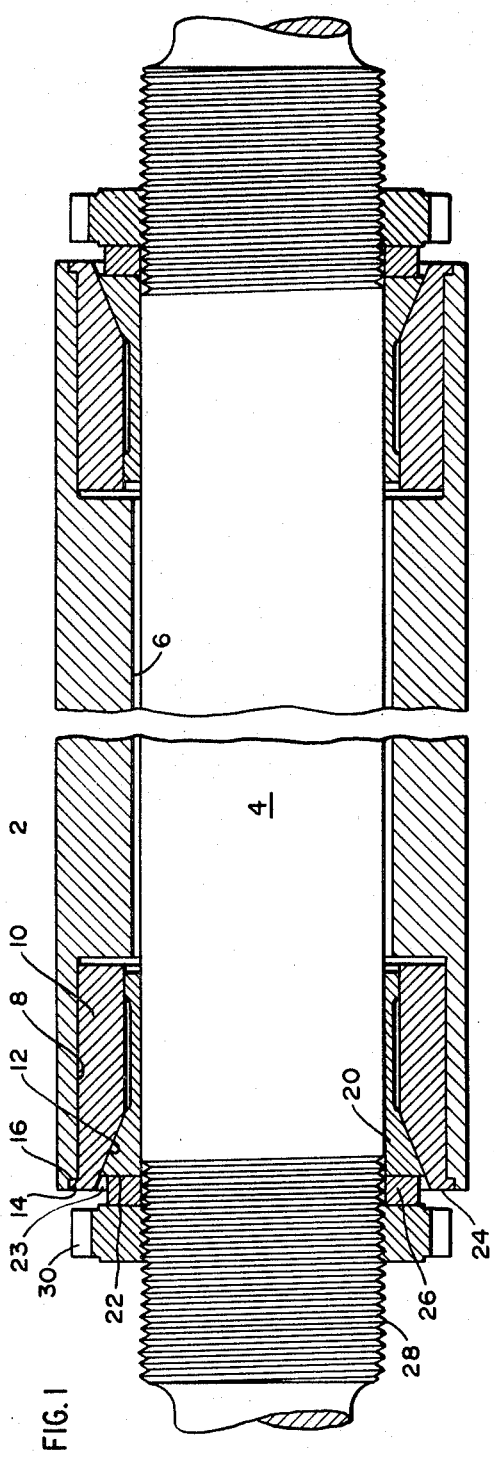
FIG. 1 is an elevation partly in section of one embodiment of the invention.

Referring to FIG. 1, a single cylindrical printing plate or roll 2 having a bore 6 is mounted on a shaft 4. The plate or roll 2 may be of conventional nature as to material, that is, may be made of a suitable magnesium alloy and for printing purposes may then be plated on its exterior in conventional manner. The material of the plate 2 and its additional exterior plating are not a part of this invention.

At each end of the cylinder there is provided the counter bore 8 into which is squeeze fitted a collet sleeve 10. Collet sleeve 10 is provided with the tapered conical throat 12, and if desired, the sleeve may be provided with an outer flange 14 which is seated in a suitable shouldered recess 16 provided at the end of the cylinder. Of course, it is not necessary that the plate or roll 2 be provided with the inserted sleeves 10. If the roll material is hard enough, the tapered collet throat 12 may be machined or otherwise formed directly in the roll itself. However, in view of the fact that the cylinder plate 2 is often made of a soft material such as magnesium or aluminum, the use of the collet sleeves 10 provides for very close tolerances and precision adjustment of the rolls, with respect to the shaft and with respect to the material being printed by the rolls.

A collet 20 is mounted on the shaft and seated within the collet sleeve 10. It will be noted that the collet is so dimensioned that when seated in the collet sleeve, the outer face 22 is positioned inwardly of the plane defining the end 24 of the cylinder to provide recess 23. The purpose of this will be described later.

A spacer 26 slides on the shaft 4 and lies against the outer face of the collet. Shaft 4 is provided with threads 28, and a nut 30 is screwed on the threads to bear against the spacer 26. By turning the nut, the spacer is forced against the collet face 22 to lock the collet to the shaft.

The above construction is the same for both ends of the first embodiment. As a result, it will be observed that if one wishes to move the cylinder 2 axially on the shaft, all that is necessary is to loosen one of the nuts and then tighten the other nut against its collet, thus moving the cylinder in the direction desired. Thereafter, the collets are locked to the shaft to hold the cylinder in its new position.

Figure 2:
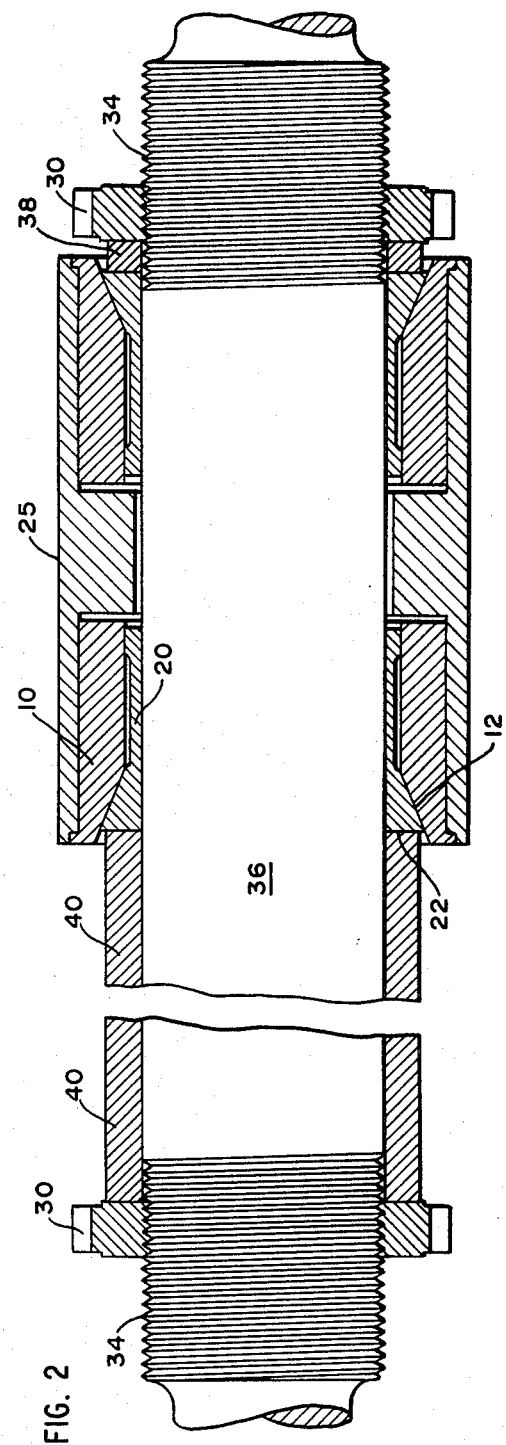
FIG. 2 is an elevation partly in section of a second embodiment of the invention.

By the use of this invention, it is possible to adjust a short cylinder plate (for example) at any given point on a longer shaft. Reference to FIG. 2 shows how this is done, and a short cylinder 25 is provided at each end with the same kind of collet sleeves 10 and collets 20. In this case, the threads 34 are provided near the respective ends of the shaft 36. At one end of the roll 2 there is provided a spacer 38 and nut 30 like the spacer 26 and nut 30 of the first embodiment. However, this embodiment differs from the first embodiment in that an elongated spacer 40 is provided at the other end of the roll 25 and nut 30 at this end of the shaft bears against the elongated spacer which in turn bears against the outer face 22 of the collet 20. Thus, by turning the nuts 30 against each other, the spacers are forced toward each other to cause the collets 20 to lock against the shaft and thus anchor the roll 25 thereto in the position determined by the relative length of the spacers and the positions of the threads on the shaft.

Thus, if one wishes to shift the position of the cylinder, this may be accomplished in two ways. In the first way for fine adjustment within the axial lengths of the threads 34, the cylinder may be adjustably positioned by moving the nuts to various positions on the threads. On the other hand, for coarse positioning, then the respective lengths of the spacers 38 and 40 are changed until the roll 2 is in its approximate coarse position. Thereafter, the fine adjustment is made as given above.

The angle of the collet sleeve throat and collet, indicated by letter A in FIG. 4, has been found to be important in respect to the ease with which adjustments may be made by loosening the nuts 30. If the angle is too small with respect to the axis of the shaft, then it has been found that the collets tend to jam into the position in which they have previously been tightened, with the result that they must be knocked loose. During such loosening, the printing cylinder itself may become damaged. On the other hand, if the angle is too large, then it will be found that too much force is required to tighten the collets against the shaft, and this may damage the face of the collets. Also, because with such a steep angle only a very slight loosening of the nuts would loosen the collets sufficiently to allow the printing cylinder unwantedly to move either lengthwise or rotate with respect to the shaft.

As a result of tests, it has been found that the optimum collet (or collet sleeve) angle is approximately 22° 30'. However, for the good results and ease of use, this angle may vary within the range of 18° to 28°.

A further advantage of the angle specified is that it permits use of relatively short collets, which in turn permits use of relatively short printing rolls.

Another feature to be noted is that when the nuts are loosened, but without the necessity of having to unjam the collets, the cylindrical plates can be rotated while on the shaft while still mounted on the printing machine, in order to correct registration. This is particularly important when two or more color printing with two or more heads is being done. In order to make such adjustment with this invention, the nuts have to be loosened just enough to permit the accurate axial adjustment as well as the rotational correction.

Referring now to FIG. 3, a third embodiment of the invention is shown, in which there is illustrated in detail the construction used to fasten two cylinders 2 and 42 together to form a longer total cylinder. (Cylinders 2 and 42 have been given different numerals for convenience in explaining this embodiment. However, it will be understood that each of the cylinders 2 and 42 may be the same in all respects.)

As above, each of the cylinders or rolls has provided at its ends with counter-bores 8, collet sleeves 10 having the throats 12, and collets 20. The shaft 4 has threads 28, and each end of the combined cylinders are provided spacers 26 like those of the first embodiment. Nuts 30 on threads 28 bear against the spacers and thus force the collets 20 at each end to close against the shaft to lock the outer ends of the cylinders 2 and 42 to the shaft.

At the inner ends of the cylinders, they butt tightly together in the plane defining the ends of the cylinders. This plane is referred to in FIG. 3 by numeral 44.

It will now be noted that because the outer faces of the inner collets are positioned within the ends of the cylinder to provide the recesses 23, there is thus provided a total space 48 (see FIGS. 3 and 5) equal to the sum of spaces 23, between the outer faces of these collets. Within this space there is provided resiliently deformable means for applying an axial force to the collets so as to close them on shaft 4 and anchor the inner ends of the plates 2 and 42 to the shaft. In this embodiment, this means takes the form of a grommet of elastomeric material, such as rubber O-ring 50. The O-ring is so dimensioned with respect to the space 48 that at the point that the outer collets 20 have been caused (by turning nuts 30) to close down on the shaft to lock these outer ends, the rubber grommet 50 has deformed sufficiently so that its resistive force against deformation will exert sufficient force against the inner collets 20 to cause them also to close down on the shaft at the inner ends. It will be noted that during this locking action, the ends of the cylinders are forced into and remain in tight butting engagement at the plane 44.

It is preferred that the O-ring 50 be of such inner diameter as to fit snugly on the shaft 4. This is not necessary, but it will be found that if this is done, then when the O-ring is compressed by screwing the nuts 30 in a direction toward each other, the radial deformation of the O-ring will be mostly in an outer direction and in such manner as to create a greater force against the inner collets 20 than would otherwise be the case. Also, by having the O-rings a snug fit, they serve to maintain a given cylinder in a given position on the shaft prior to final adjustment. An advantage of this invention is that when the nuts 30 are unscrewed away from each other, the rubber O-rings will force the printing plate cylinders away from each other for easy disassembly.

If desired, instead of using a rubber O-ring having a circular cross-section, a grommet 52 having a rectangular cross-section such as shown in FIG. 6 may be used, and this is particularly desirable where very high forces are required to close all collets and maintain the abutting ends of the rolls firmly in engagement.

As an example, a pair of printing rolls 3 13/16 inches in diameter were mounted on a shaft 2 1/4 inches in diameter. The above angle of 22° 30' was used for the collets. The collets at the inner end were seated within the collet sleeves sufficiently so that the total space 48 was 1/32 inches in axial length. A rubber O-ring having an outside diameter of 2⅝ inches and an inside diameter of 2 13/64 inches was slid on the shaft to occupy the space 48. The ring had a Shor Type A-2 durometer of 65. Threads 28 were 2¼–12. Spacers 26 were ¼ inch thick, had an inner diameter of just over 2¼ inches to slide on the shaft and an outer diameter of 2 15/16 inches. (The outer diameter was such as to enable the spacer to freely bear against the collet faces within the spaces or recesses 23.)

All of the above dimensions are approximate with standard manufacturing tolerances.

The above example worked successfully. When the nuts were tightened against the faces of the end collets to lock them to the shaft, the inner collets also locked and the cylinder ends were in tight abutment.

Again, in this third embodiment, many of the advantages of the first two embodiments are obtained. By simply loosening the nuts 30, the rolls may be rotated with respect to each other and with respect to the shaft so as to place any printing engravings on one roll in strict proper registration or alignment with respect to engravings on the other roll. Also, within the limits of the length of threads 28 on the shaft, the two rolls may be adjusted as a unit axially along the shaft to a desired precise location. Furthermore, it is possible to have more than the two rollers illustrated, and all inner ends will be locked to the shaft and be in tight abutment, if the teaching of this application is followed. Regardless of the number of cylindrical printing rolls, and when the outer end nuts 30 are tightened, then it will be found that the ends will tightly abut and the deformable means 50 at each pair of butting ends will be deformed sufficiently to cause the collets at these ends to lock against the shaft and thus lock these ends of the rolls to the shaft.

It will be also noted that instead of the grommet 50, a suitably designed mechanical spring may be used. For example, a simple compression spring, or a pair of springs known as Belleville washers or springs may be used. Of course, mechanical springs will be so designed as to exert the necessary forces against the inner collets to lock them to the shaft when the nuts 30 are tightened against the outer collets.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above construction without departing from the scope of the invention, it is intended that all matters contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. In combination a shaft, a plurality of axially-aligned printing rolls having bores and being axially mounted on the shaft, and a plurality of collets for locking both ends of each roll to the shaft with the inner end of each roll in tight abutment with the end of the adjacent roll; the ends of each bore being tapered outwardly at an angle to the bore axis to form a collet seat; a collet in each collet seat with the shaft passing therethrough, and each collet being provided with an outer wall portion tapered at an angle matching the angle of the collet seat; the inner collets in the collet seats at abutting ends of said rolls being positioned within said seats to provide a space between the faces of said inner collets; resiliently deformable means in said space for applying axially-directed force against the inner collets when the deformable means is deformed; and means cooperating with said shaft at the outer ends of the plurality of rolls for applying axially directed force against the outer collets in the collet seats in the non-abutting roll ends thereby simultaneously to deform said deformable means to lock to the shaft said inner collets and also said outer collets.

2. The combination of claim 1, in which said angle lies within the range of 18° to 28°.

3. The combination of claim 1 in which said angle is substantially 22° 30'.

4. The combination of claim 1, in which said resiliently deformable means comprises a ring of resilient elastomeric material surrounding said shaft.

5. The combination of claim 4, in which the ring is a torus having a circular cross-section.

6. The combination of claim 4, in which said ring when not deformed fits snugly on the shaft.

7. The combination of claim 4, in which said ring has a rectangular cross-section.

8. The combination of claim 4, in which said elastomeric material has a Shore Type A.2 durometer of approximately 65.

* * * * *